(12) United States Patent
Yoshida et al.

(10) Patent No.: US 7,940,610 B2
(45) Date of Patent: May 10, 2011

(54) OPTICAL HEAD WITH ADHESIVE RELIEF PORTIONS

(75) Inventors: Tetsuya Yoshida, Osaka (JP); Togo Kojima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1208 days.

(21) Appl. No.: 11/598,730

(22) Filed: Nov. 14, 2006

(65) Prior Publication Data

US 2007/0147194 A1    Jun. 28, 2007

(30) Foreign Application Priority Data

Dec. 28, 2005    (JP) ................................ P2005-377921

(51) Int. Cl.
*G11B 7/00* (2006.01)
(52) U.S. Cl. ..................................... 369/44.15; 720/681
(58) Field of Classification Search .... 369/44.14–44.16, 369/44.22; 720/681–685
See application file for complete search history.

(56) References Cited

U.S. PATENT DOCUMENTS

| 5,787,067 A | * | 7/1998 | Song ............................... 720/687 |
| 6,185,180 B1 | * | 2/2001 | Morishita ....................... 720/681 |
| 6,603,727 B1 | | 8/2003 | Ohtsuka ......................... 369/247 |
| 6,683,756 B1 | * | 1/2004 | Zhao et al. .................. 360/265.8 |

FOREIGN PATENT DOCUMENTS

| EP | 1 551 013 A2 | 7/2005 |
| JP | 3-19139 | 1/1991 |
| JP | 9-16993 | 1/1997 |
| JP | 2002-74712 | 3/2002 |
| JP | 2002-133684 | 5/2002 |
| JP | 2005-85310 | 3/2005 |
| WO | WO 98/54705 | 3/1998 |

* cited by examiner

*Primary Examiner* — Wayne R Young
*Assistant Examiner* — Nathan A Danielson
(74) *Attorney, Agent, or Firm* — Morgan, Lewis & Bockius LLP (57) ABSTRACT

An optical head includes an objective lens held by a lens holder that is driven by a coil. The optical head includes: a base, including a mounting face having an opening portion; a substrate, operable to supply an electric power to the coil, and including a first portion; and a supporter, mounted on the mounting face, and including a second portion which faces the first portion and which is formed with a recessed portion that is connected with the opening portion.

5 Claims, 5 Drawing Sheets

OPTICAL HEAD WITH ADHESIVE RELIEF PORTIONS

BACKGROUND OF THE INVENTION

The present invention relates to an optical head for recording or reading data by applying light to an optical disk.

In recent years, as a recording medium for recording an image, an audio or information, an optical disk such as a CD (Compact Disc), a DVD (Digital Versatile Disc) or the like has been employed that can read (or record) the image, the audio or the information by applying light thereto. An optical head is used for applying a laser beam to a recording layer of the optical disk to record data on the recording layer and (or) detecting the laser beam reflected from the recording layer to read the data.

Figure 1:
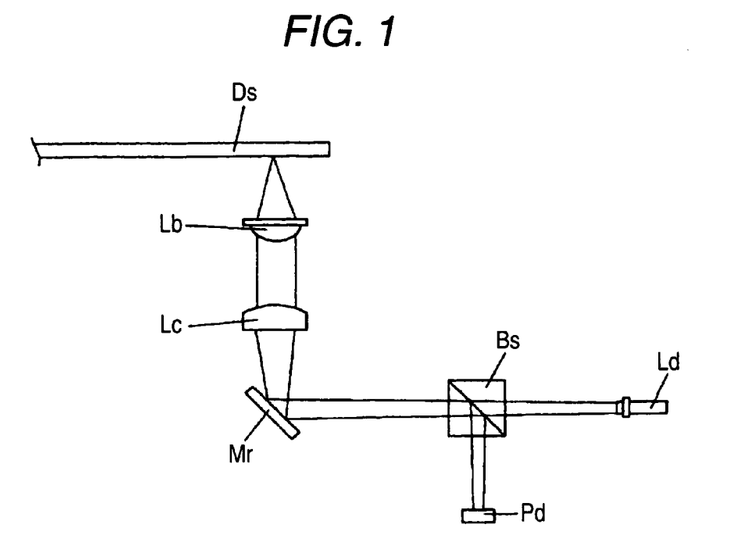
FIG. 1 is an arrangement diagram of one embodiment of an optical head.

In FIG. 1, an arrangement diagram of the optical head is shown. As shown in FIG. 1, the optical head includes a laser light source Ld, a mirror Mr, a collimator lens Lc, an objective lens Lb, a beam splitter Bs and a light receiving element Pd. A laser beam applied from the laser light source Ld is reflected by the mirror Mr and is incident on the collimator lens Lc. The laser beam incident on the collimator lens Lc is outputted as a parallel light and is incident on the objective lens Lb. The laser beam incident on the objective lens Lb is applied to the recording layer of an optical disk Ds.

At this time, the laser beam is applied so that an image of a laser spot is formed on the recording layer of the optical disk Ds and an optical axis is vertical to the recording layer of the optical disk Ds. The beam splitter Bs is a prism that transmits a part or all of the laser beam outputted from the laser light source Ld and reflects a part or all of the laser beam reflected on the optical disk Ds. The beam splitter Bs serves to guide the laser beam outputted from the laser light source Ld to the recording layer of the optical disk Ds and guide the laser beam reflected by the optical disk Ds to the light receiving element Pd. The light receiving element Pd is an optical element for converting light to an electric current to read data in accordance with the intensity of light.

Since the optical head applies the laser beam to the rotating optical disk, the objective lens for applying the laser beam to the optical disk needs to follow the deviation or the tilt of the optical disk. Thus, the optical head uses a lens holder for holding the objective lens supported by a plurality of metal elastic members (wire springs). The lens holder is driven in a vertical direction (a focusing direction), a rightward and leftward direction (a tracking direction) and a tilting direction (tilt).

Figure 7:
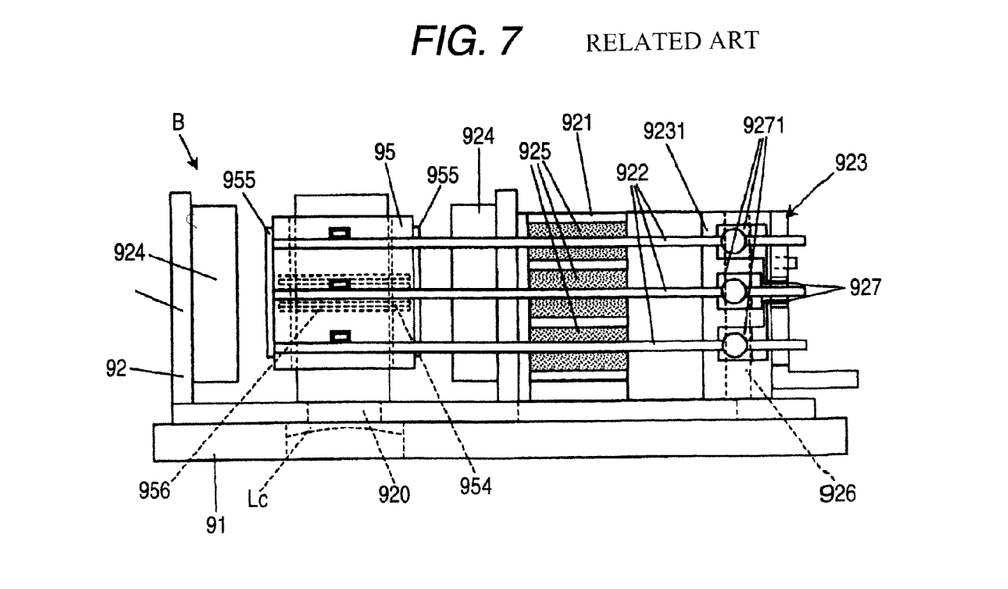
FIG. 7 is a side view of a related optical head.
Figure 8:
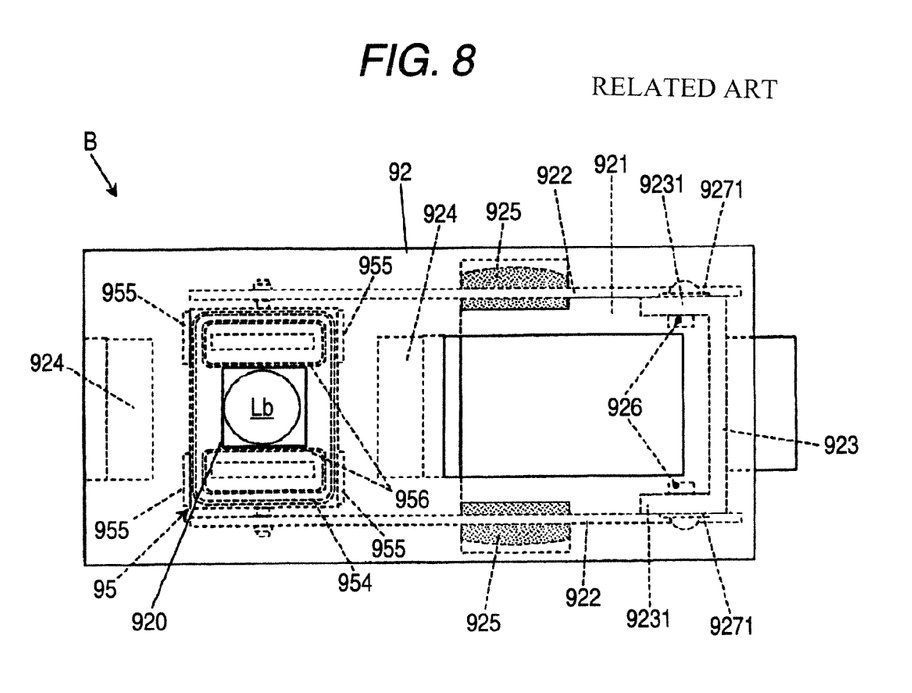
FIG. 8 is a bottom view of the related optical head.

FIG. 7 shows a side view of one example of a related optical head. FIG. 8 shows a bottom view of the optical head shown in FIG. 7. The optical head B shown in FIGS. 7 and 8 includes a base 91 to which a collimator lens Lc is attached and an actuator base 92 (designated by an act base 92, hereinafter) in which a lens holder 95 for holding an objective lens Lb. The act base 92 is fixed to the base 91. In the act base 92, a through hole 920 is formed and a laser beam outputted from the collimator lens Lc passes through the through hole 920 and is incident on the objective lens Lb.

In the lens holder 95, coils 954, 955 and 956 are formed for focusing the objective lens Lb to vertically move the objective lens Lb relative to the optical disk, tracking the objective lens Lb to move the objective lens in the radial direction of the optical disk and tilting the objective lens Lb to allow the objective lens to follow the tilt of the optical disk. On the act base 92, a pair of permanent magnets 924 are arranged. The lens holder 95 is disposed in a magnetic field generated by the permanent magnets 924. Thus, a prescribed magnetic field by the permanent magnets 924 acts on the coils 954, 955 and 956. Under this state, when a prescribed current is supplied to the coils 954, 955, and 956, a Lorentz force is exerted on the coils, respectively. The lens holder 95 is driven by this Lorentz force to carry out the focusing, the tracking and the tilting operations of the objective lens Lb, respectively.

The lens holder 95 is supported by a support member 921 provided on the act base 92 through metallic wire springs 922 having an elasticity. The wire springs 922 support the lens holder 95 and are also used as transmission lines for supplying an electric current to the coils 954, 955 and 956. The three wire springs 922 are respectively arranged on both the surface sides of the lens holder 95 and are respectively paired and connected to the coils 954, 955 and 956. The wire springs 922 are soldered to the side surfaces of the lens holder 95 to elastically support the lens holder 95.

On the side surfaces of the support member 921, gel type damping members 925 having a visco-elasticity are arranged to cover the wire springs 922. Thus, the wire springs 922 are restrained from being damped by the damping members 925. On the support member 921, a flexible substrate 923 for supplying an electric current to the wire springs 922 is attached to a surface opposite to the lens holder 95.

The flexible substrate 923 has turning portions 9231 arranged on the side surfaces of the support member 921. On the side surfaces of the support member 921, adhesive recessed groove portions 926 are formed for applying an adhesive agent so that the turning portions 9231 of the flexible substrate 923 are not separated from the support member 921. A thermosetting adhesive agent is injected to the adhesive recessed groove portions 926 to stick the turning portions 9231 of the flexible substrate 923 to the support member 921, so that the turning portions 9231 of the flexible substrate 923 can be prevented from being separated from the support member 921. Further, the adhesive agent can come into contact with the support member 921, the flexible substrate 923 and the act base 92 and firmly adhere these members together so that the members are not respectively separated from others.

On the flexible substrate 923, electric power wiring 927 are formed for supplying an electric power to the wire springs 922. On the turning portions 9231, land portions 9271 are formed in which the electric power wiring 927 are exposed outside. The wire springs 922 are soldered to the land portions 9271 so that the electric power wiring 927 can be electrically conducted to the wire springs 922. Accordingly, the electric power can be supplied respectively to the coils 954, 955 and 956 through the wire springs 922.

JP-A-2005-85310 and JP-A-2002-133684 disclose the other arts related to the present invention In a producing process of the optical head B, a quantity of injection of the adhesive agent to be injected to the adhesive recessed groove portions 926 is hardly finely controlled. Further, even when the quantity of the injection of the adhesive agent can be controlled, much labor and time are necessary for controlling the quantity of the adhesive agent. As a result, the production cost of the optical head B is increased.

When the quantity of the injection of the adhesive agent cannot be controlled so that the quantity of the adhesive agent is too low, the turning portions 9231 of the flexible substrate 923 cannot be adequately fixed to the support member 921. The land portions 9271 insufficiently come into contact with the wire springs 922. Thus, the electric power may not be sometimes supplied to the coils 954, 955 and 956. Consequently, irradiation accuracy of the laser beam to the optical disk Ds is degraded.

When an excessive adhesive agent is injected to assuredly adhere the turning portions 9231 to the support member 921, the excessive adhesive agent overflowing from the adhesive recessed groove portions 926 sticks to the land portions 9271. When the adhesive agent sticks to the land portions 9271, since the adhesive agent is an insulating material, the adhesive agent prevents the land portions 9271 from being electrically conducted to the coils 954, 955 and 956. Thus, control accuracy of the objective lens Lb is deteriorated. When the control accuracy of the objective lens Lb is deteriorated, accuracy for reading data from the optical disk Ds and (or) recording data on the optical disk Ds by the laser spot is lowered, so that the reliability of the optical head B is deteriorated.

Further, when the excessive adhesive agent adheres to the support member 921 and the act base 92, since the adhesive agent is contracted when the adhesive agent is hardened, an unnecessary stress or strain is generated in the act base 92 or the support member 921. Thus, even under a state that the electric current does not flow, the position of the objective lens Lb may possibly deviate from a prescribed position. Accordingly, there is a fear that the follow-ability of the laser beam relative to the optical disk is deteriorated.

Further, when the thermosetting adhesive agent is injected to the adhesive recessed groove portions 926, in portions surrounded by the adhesive recessed groove portions 926 and the turning portions 9231 of the flexible substrate 923, air in the surrounded portions is hardly vented, so that it takes much time to inject the thermosetting agent and produce the optical head.

SUMMARY

It is therefore an object of the invention to provide an optical head that can prevent an adhesive agent from overflowing and sticking to portions except portions to which the adhesive agent is originally to be stuck so as to hinder producing, without finely controlling a quantity of use of the adhesive agent, and can restrict a production cost by reducing the more a labor and time necessary for the production.

In order to achieve the object, according to the invention, there is provided an optical head comprising:
a base;
an act base, fixed to the base;
a support member, fixed to the act base;
a lens holder, holding an objective lens;
a linear wire spring, fixed to the support member, and elastically supporting the lens holder;
a flexible substrate, attached to the support member, wherein
the act base has a bottom portion having a flat shape and having an opening portion that is a through hole,
the flexible substrate includes an electric wiring for supplying an electric power and has:
  a main body portion;
  a turning portion which is connected to the main body portion and is bendable relative to the main body portion; and
  a land which is provided with the turning portion, is exposed outside and is soldered to the wire spring,
the support member is fixed so as to close the opening portion and includes:
  a substrate attaching portion which is formed at a surface opposite to a surface facing the lens holder and on which the main body portion of the flexible substrate is arranged;
  an adhesive portion which is formed at a surface adjacent to the substrate attaching portion and which adheres with the turning portion of the flexible substrate; and
  an adhesive recessed groove which is formed on the adhesive portion so as to extend from a surface held in contact with the act base to an opposite surface and in which a thermosetting adhesive agent for adhering the turning portion of the flexible substrate is injected, the lens holder includes:
  a focus coil which allows the lens holder to come close to or separate from a disk surface of an optical disk;
  a tracking coil which allows the lens holder to move in a direction parallel to the disk surface;
  a tilt coil which allows the lens holder to follow an inclination of the disk surface; and
  a wire attaching portion which is electrically connected to the focus coil, the tracking coil and the tilt coil and to which the wire spring is attached by soldering,
an electric power is supplied independently to the focus coil, the tracking coil and the tilt coil through the wire spring from the land, and
the adhesive recessed groove is formed in a cylindrical space having an end portion opened by arranging the turning portion of the flexible substrate, and an end portion held in contact with the act base has an adhesive agent relief portion that has a recessed groove shape deeper than the adhesive recessed groove so as to be connected to the opening portion.

In order to achieve the object, according to the invention, there is also provided an optical head comprising:
an act base;
a support member, fixed to the act base;
a lens holder, holding an objective lens;
a linear wire spring, fixed to the support member, and elastically supporting the lens holder;
a flexible substrate, attached to the support member, wherein
the act base has a bottom portion having a flat shape and having an opening portion,
the flexible substrate includes an electric wiring for supplying an electric power and has:
  a main body portion;
  a turning portion which is connected to the main body portion and is bendable relative to the main body portion; and
  a land which is provided with the turning portion, is exposed outside and is soldered to the wire spring,
the support member is fixed so as to close the opening portion and includes:
  a substrate attaching portion which is formed at a surface opposite to a surface facing the lens holder and on which the main body portion of the flexible substrate is arranged;
  an adhesive portion which is formed at a surface adjacent to the substrate attaching portion and which adheres with the turning portion of the flexible substrate; and
  an adhesive recessed groove which is formed on the adhesive portion so as to extend from a surface held in contact with the act base to an opposite surface and to which a thermosetting adhesive agent for adhering the turning portion of the flexible substrate is injected,
the lens holder includes at least one coil which drives the lens holder, and an electric power is supplied independently to the at least one coil through the wire spring, and
one end portion of the adhesive recessed groove is arranged to face a surface perpendicular to the adhesive portion of the support member, and the other end portion is arranged to be held in contact with the act base and includes an adhesive agent relief portion formed to be connected to the opening portion.

A plurality of adhesive recessed grooves may be formed in the adhesive portion.

At least two of the plurality of the adhesive recessed grooves may be connected to a common adhesive agent relief portion.

The adhesive recessed groove has a curved shape.

In order to achieve the object, according to the invention, there is also provided an optical head including an objective lens held by a lens holder that is driven by a coil, the optical head comprising:

a base, including a mounting face having an opening portion;

a substrate, operable to supply an electric power to the coil, and including a first portion; and a supporter, mounted on the mounting face, and including a second portion which faces the first portion and which is formed with a recessed portion that is connected with the opening portion.

DETAIL DESCRIPTION OF PREFERRED EMBODIMENTS

Now, an embodiment of the present invention will be described below by referring to the drawings. An optical head A1 shown in FIG. 2 substantially has the same structure as that of the related optical head. Namely, the optical head A1 includes a laser light source Ld, a mirror Mr, a collimator lens Lc, an objective lens Lb, a beam splitter Bs and a light receiving element Pd. A laser beam applied from the laser light source Ld is reflected by the mirror Mr and is incident on the collimator lens Lc. The laser beam incident on the collimator lens Lc changes to a parallel light and is outputted from the collimator lens Lc. The laser beam outputted from the collimator lens Lc is incident on the objective lens Lb and is applied to an optical disk Ds from the objective lens Lb.

Figure 2:
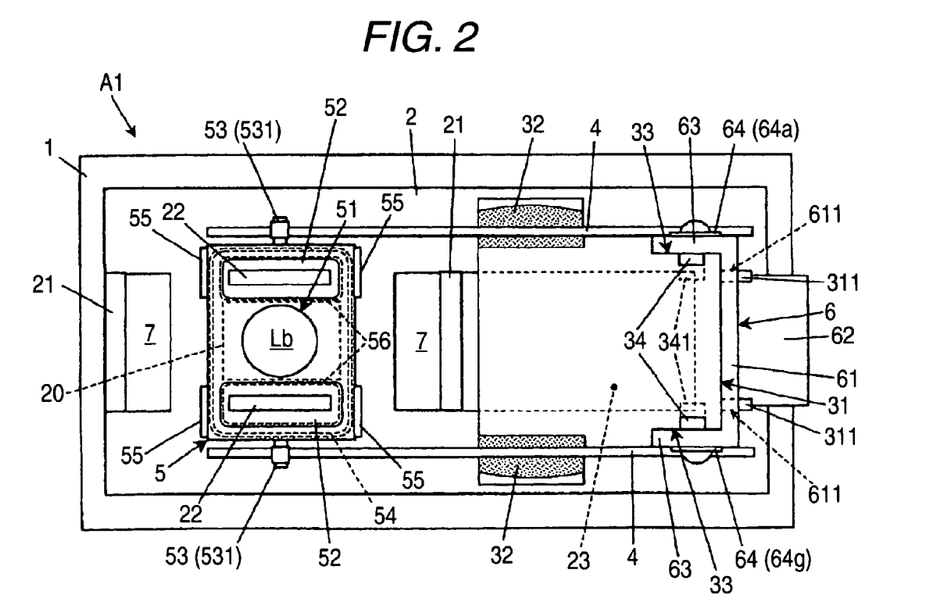
FIG. 2 is a plan view of an optical head according to the present invention.

At this time, the laser beam is focused on a recording layer of the optical disk Ds and applied to the recording layer of the optical disk so that an optical axis is vertical to the recording layer of the optical disk Ds. The beam splitter Bs is a prism that transmits a half of the incident laser beam and reflects a half of the laser beam. Further, the beam splitter Bs guides the light reflected on the optical disk Ds to the light receiving element Pd. The light receiving element Pd converts the light to an electric current to read data in accordance with the intensity of light. A sequence for applying the laser beam to the above-described members respectively is not limited thereto and the sequence may be changed within an allowable range.

Figure 3:
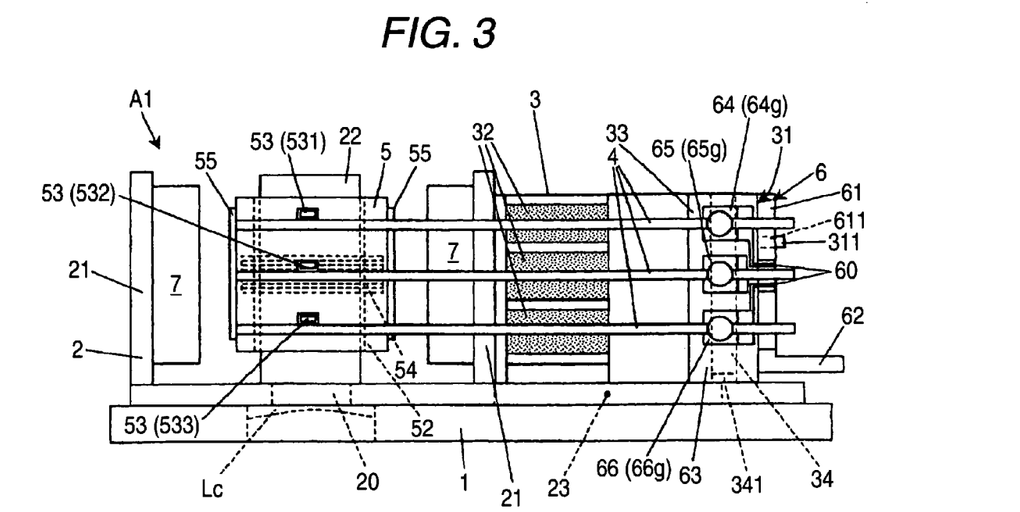
FIG. 3 is a side view of the optical head shown in FIG. 2.
Figure 4:
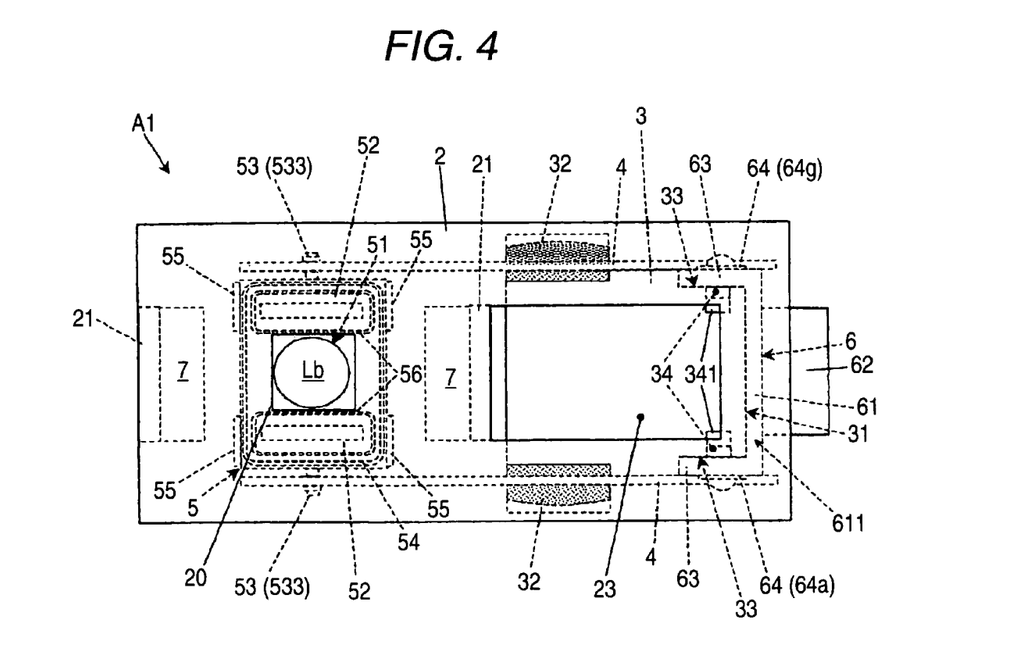
FIG. 4 is a bottom view of the optical head shown in FIG. 2.

As shown in FIGS. 2, 3 and 4, the optical head A1 includes a base 1 for supporting the collimator lens Lc, an act base 2 attached to the base 1, a support member 3 fixed to the act base 2, wire springs 4 which are elastically deformable and each of which has one end fixed to the support member 3, a lens holder 5 for holding the objective lens Lb and supported by the wire springs 4 so as to float, a flexible substrate 6 adhered and fixed to the support member 3 and permanent magnets 7 attached to the below-described rising portions 21 of the act base 2.

The Laser light source Ld, the beam splitter Bs, the mirror Mr, the collimator lens Lc and the light receiving element Pd are arranged in the base 1.

The act base 2 is adhered and fixed to the base 1 and includes a laser beam through hole 20 for allowing the laser beam outputted from the collimator lens Lc to pass, a pair of rising portions 21 provided upright from the bottom portion of the act base 2 so as to face each other, yokes 22 disposed between the pair of the rising portions 21 in a direction perpendicular to the rising portions 21 and an opening portion 23. The act base 2 is made of metal and formed by cutting and bending one sheet of a metal plate. That is, the rising portions 21 and the yokes 22 are formed by cutting and bending the metal plate. The opening portion 23 is an opening formed when one of the rising portions 21 is cut and bent.

The support member 3 includes a substrate attaching portion 31 on which a below-described main body portion 61 of the flexible substrate 6 is disposed, gel type damping members 32 for holding the wire springs 4 and having a viscoelasticity, adhesive portions 33 for adhering below-described turning portions 63 of the flexible substrate 6 on both side surfaces and adhesive recessed grooves 34 formed on one parts of the adhesive portions 33.

As shown in FIGS. 2, 3 and 4, the support member 3 is arranged so as to be partly overlapped on the opening portion 23 of the act base 2 and firmly fixed to the act base 2 by bolts whose illustration is omitted. Further, on the substrate attaching portion 31, positioning bosses 311 are formed. The flexible substrate 6 is arranged so that the positioning bosses 311 are engaged with below-described boss holes 611 formed on the main body portion 61 of the flexible substrate 6. Thus, the flexible substrate 6 can be positioned.

The adhesive recessed grooves 34 are formed so as to vertically pass through the support member 3 and adhesive agent relief portions 341 that are deeply cut are formed in the end portions of the adhesive recessed grooves 34 at the act base 2 side (see FIGS. 2 and 4). The adhesive agent relief portions 341 are formed so as to be overlapped (continuous to) on the opening portion 23 of the act base 2.

The wire springs 4 are metallic wires having an elasticity to elastically support the lens holder 5. Though the wire springs 4 are not limited thereto, here, three pairs of wire springs are arranged so as to correspond to the side surfaces of the support member 3.

The lens holder 5 is arranged in a space formed between the opposed rising portions 21. The lens holder 5 includes a through hole 51 for allowing the laser beam to pass and holding the objective lens Lb, yoke holes 52 through which the yokes 22 of the act base 2 pass so as not to come into contact with, wire attaching portions 53 for attaching the wire springs 4, focus coils 54 for allowing the objective lens Lb to come close to or separate in the direction (a focusing direction) perpendicular to the recording surface of the optical disk Ds, tracking coils 55 for moving the objective lens Lb in the radial direction (a tracking direction) of the optical disk Ds and tilt coils 56 for swinging (a tilting direction) the objective lens in accordance with the tilt of the optical disk Ds.

Three pairs of wire attaching portions 53 are formed. First wire attaching portions 531 are electrically connected to the focus coils 54, second wire attaching portions 532 are electrically connected to the tracking coils 55 and third wire attaching portions 533 are electrically connected to the tilt coils 56. The wire springs 4 are attached to the wire attaching portions 53 by soldering. The lens holder 5 is elastically supported so as not to come into contact with the act base 2 by the elastic force of the wire springs 4.

The flexible substrate 6 includes a print wiring 60, the main body portion 61, a wiring connecting portion 62 connected to an external substrate whose illustration is omitted to supply an electric power to the flexible substrate 6, the turning portions 63 formed integrally with the main body portion 61 and abutting on the adhesive portions 33 when the flexible substrate is disposed on the support member 3, and first lands 64, second lands 65 and third lands 66 formed on the turning portions 63 and exposed outside the flexible substrate 6.

The first lands 64, the second lands 65 and the third lands 66 respectively supply the electric power and include cathode side lands 64*a*, 65*a* and 66*a* and ground side lands 64*g*, 65*g* and 66*g*. The first lands 64, the second lands 65 and the third lands 66 are fixed to the wire springs 4 by soldering. Thus, the electric power is supplied to the wire springs 4 through the first land, 64*a*, the second land 65*a* and the third land 66*a*.

The wire springs 4 connected to the first lands 64 are electrically connected to the first wire attaching portions 531. The wire springs 4 connected to the second lands 65 are electrically connected to the second wire attaching portions 532. The wire springs 4 connected to the third lands 66 are electrically connected to the third wire attaching portions 533. Thus, the electric power is supplied to the focus coils 54 from the first lands 64 through the wire springs 4 and the first wire attaching portions 531, to the tracking coils 55 from the second lands 65 through the wire springs 4 and the second wire attaching portions 532, and to the tilt coils 56 from the third lands through the wire springs 4 and the third wire attaching portions 533, respectively.

In this embodiment, the ground side lands 64*g*, 65*g* and 66*g* are independently formed, however, they may be formed integrally.

The permanent magnets 7 are fixed to the rising portions 21 of the act base 2 to form a magnetic field. The magnetic field is provided in the lens holder 5 to act on a part of the focus coils 54, the tracking coils 55 and the tilt coils 56. In this embodiment, one pair of permanent magnets 7 are disposed as one example as described above, however, the present invention is not limited thereto. More magnets or one magnet that allow a proper magnetic filed to act on the focus coils 54, the tracking coils 55 and the tilt coils 56 may be employed.

The optical head A1 according to the present invention is produced in such a manner as described below. Initially, the support member 3 is arranged at a prescribed position of the act base 2 and fixed by the bolts whose illustration is omitted. At this time, the support member 3 is attached so that at least a part of the adhesive agent relief portions 341 of the adhesive recessed grooves 34 is overlapped (continuous to) on the opening portion 23 of the act base 2.

The main body portion 61 of the flexible substrate 6 is disposed on the substrate attaching portion 31 of the support member 3. At this time, the main body portion of the flexible substrate 6 is attached so that the positioning bosses of substrate attaching portion 31 pass through the boss holes 611 formed on the main body portion 61. Thus, the flexible substrate 6 can be positioned on and temporarily fixed to the support member 3 and the act base 2. Under this state, the turning portions 63 connected to both the ends of the main body portion 61 are bent in connecting portions to allow the turning portions 63 to abut on the adhesive portions 33. Under a state that the flexible substrate 6 is disposed on the support member 3, an adhesive agent is injected from an upper portion to spaces surrounded by the adhesive recessed grooves 34 of the support member 3 and the turning portions 63 of the flexible substrate 6.

The adhesive agent is injected under the pressure of air by using a cylinder having a thin tube. Air pressure is exerted on the opening portion of the cylinder to inject the adhesive agent to the spaces surrounded by the adhesive recessed grooves 34 and the turning portions 63 from the thin tube. At this time, since the adhesive agent relief portions 341 are formed in the end portions of the adhesive recessed grooves 34 in contact with the act base 2, when the adhesive agent is injected to the spaces, air present in the adhesive recessed grooves 34 is vented from the adhesive agent relief portions 341. Thus, the adhesive agent can be rapidly and smoothly injected.

Further, even when a quantity of the injection of the adhesive agent is large and exceeds the capacity of the spaces formed by the adhesive recessed grooves 34 and the turning portions 63, since the adhesive agent flows out from the adhesive agent relief portions 341, the adhesive agent flows out on the upper surface of the act base 2. Thus, an unnecessary stress can be prevented from being generated on the support member 3 due to the contraction of the adhesive agent when the adhesive agent is hardened. Further, the adhesive agent can be prevented from adhering to the lands 64, 65 and 66 (in most cases, the third lands 66 of the lowest stage) formed on the turning portions 63 to retrain the electric conductive state of the lands 64, 65 and 66 and the wire springs 4 from being disturbed.

The act base 2 to which the support member 3, to which the flexible substrate 6 is fixed, is attached is fixed by jigs (an illustration is omitted). The lens holder 5 to which the objective lens Lb, the focus coils 54, the tracking coils 55 and the tilt coils 56 are attached is disposed at a prescribed position relative to the act base, that is, at a position where the yokes 22 of the act base 2 pass through the yoke holes 52 of the lens holder 5, and is supported by jigs.

On the side surfaces (adjacent to the adhesive portions 33) of the support member 3, three pairs of damping members 32 having a visco-elasticity are vertically arranged. The three pairs of the wire springs 4 are arranged so as to pass through the damping members 32. Then, the one end portions of the wire springs 4 are respectively soldered to the first lands 64, the second lands 65 and the third lands 66 formed on the flexible substrate 6 and connected to be electrically conducted and mechanically fixed. The other end portions of the wire springs 4 are respectively connected to be electrically conducted to the wire attaching portions 53 of the lens holder 5 by soldering. Thus, the lens holder 5 is elastically supported in a non-contact state with the act base 2.

As described above, since the adhesive agent relief portions 341 of the adhesive recessed grooves 34 are formed, even when the quantity of the injection of the adhesive agent is too large during an assembly, the adhesive agent can be prevented from flowing into portions to which the adhesive agent shall not adhere or flow and the generation of an inconvenience due to the adhesion or the solidification of the adhesive agent can be suppressed.

Figure 5A:
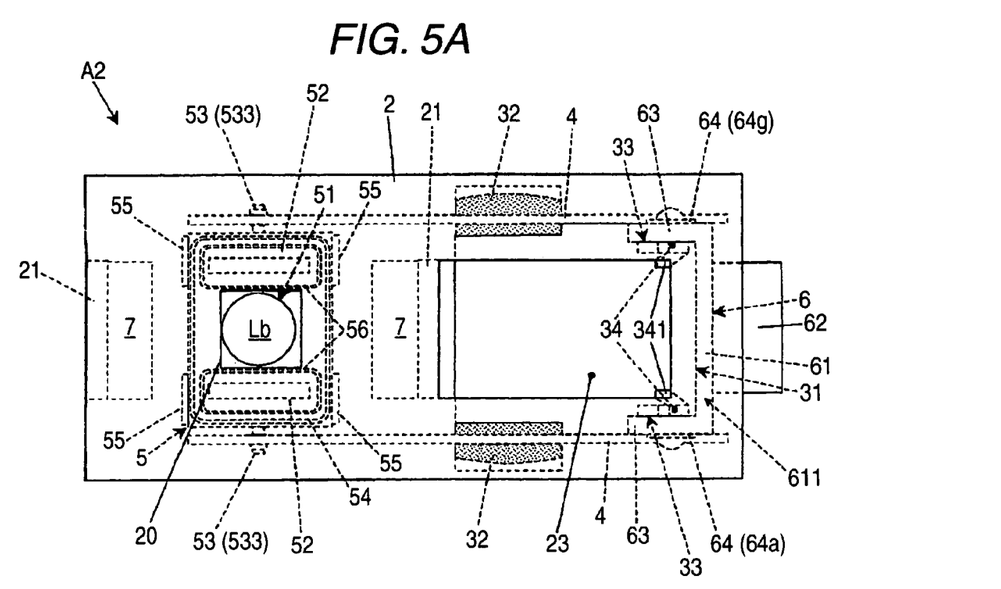
FIG. 5A is a bottom view of another embodiment of an optical head according to the present invention and FIG. 5B is a side view of the optical head shown in FIG. 5A.

In the optical head A2 shown in FIG. 5A, the position of an opening portion 23 deviates from the positions of adhesive recessed grooves 34*b* of a support member 3*b*. The optical head A2 has the same structure as those of the optical heads shown in FIGS. 2, 3 and 4 except the above-described point and substantially the same members as those shown in FIGS. 2, 3 and 4 are designated by the same reference numerals.

In the adhesive recessed grooves 34b of the support member 3b shown in FIG. 5A, even when the depth of the adhesive recessed grooves in contact with the act base 2 is extended, the adhesive recessed grooves are not connected to the opening portion 23, adhesive agent relief portions 341b are slantingly formed relative to the grooves so that the adhesive recessed grooves are connected to the opening portion 23. Thus, when an adhesive agent is injected, air and excessive adhesive agent can be assuredly discharged.

Figure 5B:
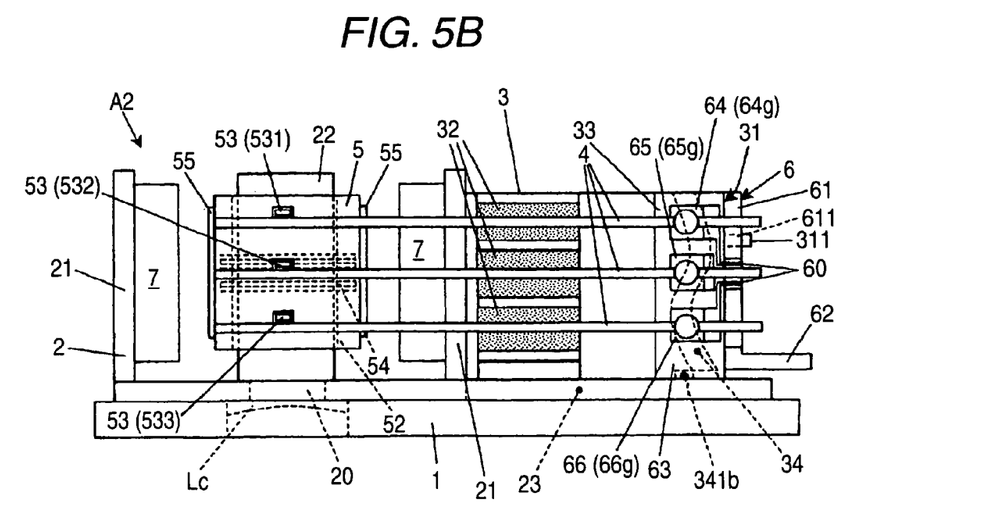

As shown in FIG. 5B, the adhesive recessed grooves 34b may be curved in the planes of adhesive portions 33b. The adhesive recessed grooves 34b are curved so that the adhering area of the adhesive agent in turning portions 63 of the flexible substrate 6 is increased. Thus, the flexible substrate 6 can be more firmly adhered to the support member than that using the linear adhesive recessed grooves. As a curved form, a form in which a resistance to an injection of the adhesive agent is not excessively increased may be widely employed.

Figure 6:
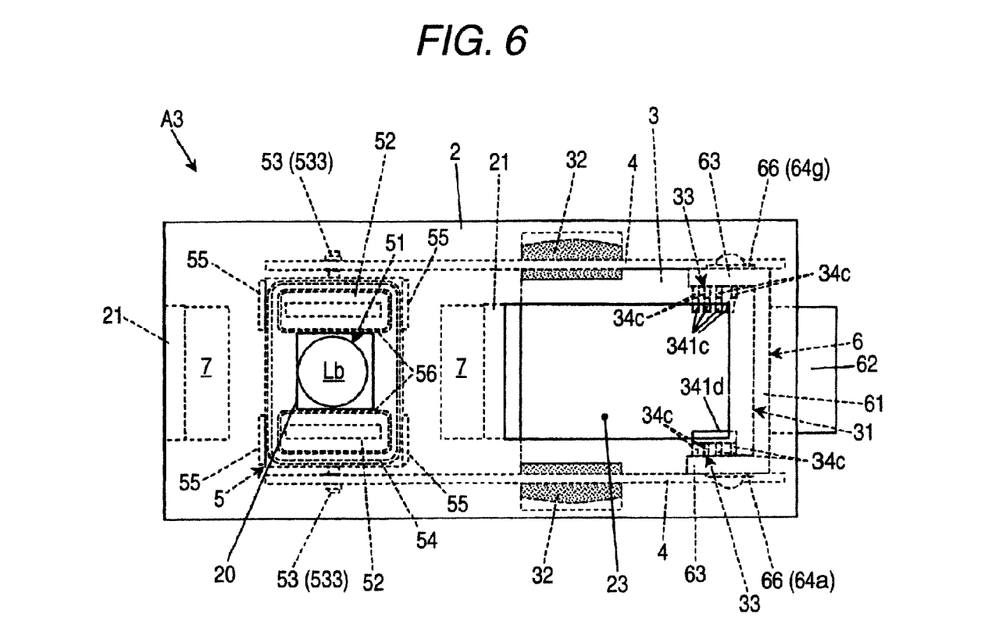
FIG. 6 is a bottom view of a still another embodiment of an optical head according to the present invention.

Like an optical head A3 shown in FIG. 6, the optical head may include a plurality of adhesive recessed grooves 34c. Since the plurality of adhesive recessed grooves 34c are provided, the adhering area of an adhesive agent in turning portions 63 of a flexible substrate 6 is increased. Accordingly, the flexible substrate can be more firmly adhered to a support member and an act base than the flexible substrate using one adhesive recessed groove. At this time, as shown in an upper side in FIG. 6, the adhesive recessed grooves 34c may be respectively connected to separate adhesive agent relief portions 341c. As shown in a lower side of FIG. 6, the adhesive recessed grooves may be connected to a common adhesive agent relief portion 341d. The common adhesive agent relief portion 341d may be connected to all the adhesive recessed grooves 34c or may be connected to a part of the adhesive recessed grooves 34c.

According to the present invention, an adhesive agent can be prevented from overflowing and sticking to portions except portions to which the adhesive agent is originally to be stuck to hinder producing, without finely controlling a quantity of use of the adhesive agent, and a production cost can be restricted by reducing the more a labor and time necessary for the production.

The optical head of the present invention can be applied to an optical disk device that reads information by applying a laser beam to an optical disk such as a DVD, a CD, an LD, or the like or records information on the optical disk capable of writing the information.

What is claimed is:
1. An optical head comprising:
 a base;
 an act base, fixed to the base;
 a support member, fixed to the act base;
 a lens holder, holding an objective lens;
 a linear wire spring, fixed to the support member, and elastically supporting the lens holder;
 a flexible substrate, attached to the support member, wherein
 the act base has a bottom portion having a flat shape and having an opening portion that is a through hole,
 the flexible substrate includes an electric wiring for supplying an electric power and has:
  a main body portion;
  a turning portion which is connected to the main body portion and is bendable relative to the main body portion; and
  a land which is provided with the turning portion, is exposed outside and is soldered to the wire spring,
 the support member is fixed so as to close the opening portion and includes:
  a substrate attaching portion which is formed at a surface opposite to a surface facing the lens holder and on which the main body portion of the flexible substrate is arranged;
  an adhesive portion which is formed at a surface adjacent to the substrate attaching portion and which adheres with the turning portion of the flexible substrate; and
  an adhesive recessed groove which is formed on the adhesive portion so as to extend from a surface held in contact with the act base to an opposite surface and in which a thermosetting adhesive agent for adhering the turning portion of the flexible substrate is injected,
 the lens holder includes:
  a focus coil which allows the lens holder to come close to or separate from a disk surface of an optical disk;
  a tracking coil which allows the lens holder to move in a direction parallel to the disk surface;
  a tilt coil which allows the lens holder to follow an inclination of the disk surface; and
  a wire attaching portion which is electrically connected to the focus coil, the tracking coil and the tilt coil and to which the wire spring is attached by soldering,
 an electric power is supplied independently to the focus coil, the tracking coil and the tilt coil through the wire spring from the land, and
 the adhesive recessed groove is formed in an elongated space having an end portion opened by arranging the turning portion of the flexible substrate, and an end portion held in contact with the act base has an adhesive agent relief portion that has a recessed groove shape deeper than the adhesive recessed groove so as to be connected to the opening portion.

2. An optical head comprising:
 an act base;
 a support member, fixed to the act base;
 a lens holder, holding an objective lens;
 a linear wire spring, fixed to the support member, and elastically supporting the lens holder;
 a flexible substrate, attached to the support member, wherein
 the act base has a bottom portion having a flat shape and having an opening portion,
 the flexible substrate includes an electric wiring for supplying an electric power and has:
  a main body portion;
  a turning portion which is connected to the main body portion and is bendable relative to the main body portion; and
  a land which is provided with the turning portion, is exposed outside and is soldered to the wire spring,
 the support member is fixed so as to close the opening portion and includes:
  a substrate attaching portion which is formed at a surface opposite to a surface facing the lens holder and on which the main body portion of the flexible substrate is arranged;

an adhesive portion which is formed at a surface adjacent to the substrate attaching portion and which adheres with the turning portion of the flexible substrate; and an adhesive recessed groove which is formed on the adhesive portion so as to extend from a surface held in contact with the act base to an opposite surface and to which a thermosetting adhesive agent for adhering the turning portion of the flexible substrate is injected, the lens holder includes at least one coil which drives the lens holder, and an electric power is supplied independently to the at least one coil through the wire spring, and one end portion of the adhesive recessed groove is arranged to face a surface perpendicular to the adhesive portion of the support member, and the other end portion is arranged to be held in contact with the act base and includes an adhesive agent relief portion formed to be connected to the opening portion.

3. The optical head according to claim 2, wherein a plurality of adhesive recessed grooves are formed in the adhesive portion.

4. The optical head according to claim 3, wherein at least two of the plurality of the adhesive recessed grooves are connected to a common adhesive agent relief portion.

5. The optical head according to claim 2, wherein the adhesive recessed groove has a curved shape.

* * * * *